(12) United States Patent
Grant

(10) Patent No.: US 7,237,723 B2
(45) Date of Patent: *Jul. 3, 2007

(54) COORDINATE DESIGNATION INTERFACE

(76) Inventor: Isaac W. Grant, 2500 Torrey Pines Rd., #503, La Jolla, CA (US) 92037

(*) Notice: Subject to any disclaimer, the term of this patent is extended or adjusted under 35 U.S.C. 154(b) by 127 days.

This patent is subject to a terminal disclaimer.

(21) Appl. No.: 11/030,350

(22) Filed: Jan. 5, 2005

(65) Prior Publication Data
US 2005/0178839 A1 Aug. 18, 2005

Related U.S. Application Data

(63) Continuation-in-part of application No. 10/778,842, filed on Feb. 12, 2004, now Pat. No. 6,955,297.

(51) Int. Cl.
*G06K 7/10* (2006.01)

(52) U.S. Cl. ............ 235/472.01; 235/375; 235/462.01

(58) Field of Classification Search .................
235/462.01–462.45, 472.01, 472.02, 472.03,
235/375, 382.5, 454, 455, 385, 469; 382/128,
382/133; 283/117, 101
See application file for complete search history.

(56) References Cited

U.S. PATENT DOCUMENTS

| | | | |
|---|---|---|---|
| 4,623,434 A | 11/1986 | Hirschmann | |
| 5,530,207 A | 6/1996 | Dolling | |
| 5,544,254 A | 8/1996 | Hartley et al. | |
| 5,767,842 A | 6/1998 | Korth | |
| 6,043,805 A | 3/2000 | Hsieh | |
| 6,134,506 A | 10/2000 | Rosenberg et al. | |
| 6,266,048 B1 | 7/2001 | Carau, Sr. | |
| 6,281,878 B1 | 8/2001 | Montellese | |
| 6,424,334 B1 | 7/2002 | Zimmerman et al. | |
| 6,430,581 B1 * | 8/2002 | Mahoney et al. | 715/500 |
| 6,512,838 B1 | 1/2003 | Rafii et al. | |
| 6,633,223 B1 * | 10/2003 | Schenker et al. | 340/5.53 |
| 6,633,671 B2 | 10/2003 | Munich et al. | |
| 2004/0023200 A1 * | 2/2004 | Blume | 434/317 |
| 2005/0178839 A1 * | 8/2005 | Grant | 235/462.08 |
| 2005/0198095 A1 * | 9/2005 | Du et al. | 709/200 |
| 2006/0029296 A1 * | 2/2006 | King et al. | 382/313 |
| 2006/0124742 A1 * | 6/2006 | Rines et al. | 235/462.01 |

* cited by examiner

*Primary Examiner*—Thien M. Le
(74) *Attorney, Agent, or Firm*—Donn K. Harms

(57) ABSTRACT

The present invention contemplates a novel method and device that employs a coordinate scanner to monitor an identifiable surface and communicate to a computer the exact location of the placement of a pointer on any identified surface and perform a variety of preprogrammed responses. This surface is identified to a computer by identifying indicia such as a bar code or other means such as user input. The computer will perform preprogrammed electronic responses to identified points on the surface by matching the identified point on the surface with an electronic version of the surface in memory. The designated surface may be flat or it may consist of a contoured surface in a wide variety of sizes and materials. The designated surface may be a test enabling answers by point designation or an advertisement enabling ordering by designating products on the surface or other types of indicia on a surface.

24 Claims, 4 Drawing Sheets

COORDINATE DESIGNATION INTERFACE

This application is a Continuation-in-Part Application from U.S. patent application Ser. No. 10/778,842, filed Feb. 12, 2004 now U.S. Pat. No. 6,955,297.

FIELD OF THE INVENTION

The invention relates generally to an interface for generating commands to electronic systems including computer systems and deriving a preprogrammed response. More specifically, the invention relates to the methods and apparatuses enabling a user to easily identify a specific point on a designated surface which is itself identified to a data processor by the means of a surface applied means for identification such as a bar code, serial number, optical character recognition of indica, or other such means to identify the surface. Preprogrammed designated responses to a user choosing a designated point on the surface are derived from matching the designated surface having the surface identifier to a digitized rendition of the surface in computer memory. The designated surface may consist of a flat surface or it may consist of a contoured surface and be in a wide variety of sizes and materials.

BACKGROUND OF THE INVENTION

Computer systems that receive and process input data are well known in the art. Typically such systems include a central processing unit (CPU), persistent read only memory (ROM), random access memory (RAM), at least one bus interconnecting the CPU, the memory, and at least one input port to which a device is coupled for input data and commands, and output ports to which a monitor and speakers are connected to display results. Traditional techniques for inputting data have included use of a keyboard, mouse, joystick, remote control device, electronic pen, touch panel, pad or display screen, switches and knobs, and more recently handwriting recognition and voice recognition devices. However, such input devices are ill designed to work in combination with indicia and surfaces which users may be using and on which they may require additional information.

Computer systems and computer type systems have recently found their way into a new generation of electronic devices including interactive TV, toys for both education and entertainment, books, magazines, electronic cash registers, synthetic music generators, handheld portable devices including personal digital assistants (PDA), and wireless telephones. Consequently, conventional input methods and devices are not always appropriate or convenient when used with such systems.

This invention offers the unique capability, without a physical keyboard or mouse, of allowing the user to be able to point with an implement, or in some cases a finger, to any point on an identified surface and have the coordinate designator, which in this application is more generally called a scanner, transfer the coordinates designated into the computer to be matched with a virtual copy of the surface and thereafter generate an action by the computer based on the indica the computer determines is located at the designated coordinate. While the term scanner is used throughout this application to describe a means to electronically determine the point of designation on the surface by the user and match that point of designation with a point in a memory resident surface. Such devices could include sonic devices which determine a designated coordinate using sound from one or a plurality of sources, laser scanners, CCD (Charge Couple Devices), camera-based readers to optically digitize the selected surface, digitizer pads which use an energized grid to determine pointer location, and a host of other devices that could be used to both scan the surface for the designated point of by the pointer and read the surface identifier to determine the matching memorized surface to the surface being used.

The designated coordinate by the user on an identified surface is matched to the designated coordinate in a memory resident preprogrammed substantially similar virtual surface which identifies the indicia located at the coordinate chosen by the user. Software then activates a preprogrammed action or a function associated or programmed for response to the designation of the point or surface area on the identified surface. This action can be an execution of any computer program, looking up information on the identified indica in memory or on the internet, playing video, initiating speakers to pronounce the word or indica identified, or availing an infinite number of other informational media for the user.

Identification of the designated surface being used is made by placing means for surface identification such as identification indicia on the surface in front of the scanner such as an identification bar code or letter code or other means to identify the surface viewed by the scanner to the computing device operatively communicating with the scanner. At startup, the scanner, or a component thereon adapted to read the means for identification of the surface, locates the identification indicia, transfers that information to the computer which then matches the identification indicia to a memory resident preprogrammed designated surface programmed in the computer. The memory resident surface identifies to the computer and software therein each point on the identified surface and the indicia which resides at that given point. Consequently, the user, by placing a finger or other pointer at any point on the identified surface, causes the computer and software to identify the indica located at that point on the surface and to take some action in relation to the identified indica for the user. Or, the user could be given numbers or letters or codes to input the surface identification.

REFERENCES CITED

U.S. Pat. No. 6,512,838 of Rafii et al, Jan. 28, 2003 shows a 3-D sensor 20 that senses where the-user's fingers are on the template.

U.S Pat. No. 6,134,506 of Rosenberg et al. Oct. 17, 2000 shows a device for measuring a three-dimensional surface for input to a computer model.

U.S. Pat. No. 6,266,048 of Carau, Sr. Jul. 24, 2001 shows an improved Personal Data Assistant that employs a single virtual keyboard in combination therewith for data input.

U.S. Pat. No. 6,043,805 of Hsieh Mar. 28, 2000 shows a coordinate sensor located on top of a computer monitor.

U.S. Pat. No. 6,424,334 of Zimmerman et al. Jul. 23, 2002 shows a computer data entry and manipulation apparatus and method using virtual reality.

U.S. Pat. No. 6,281,878 of Montellese Aug. 28, 2001 shows an apparatus and method for inputting data.

U.S. Pat. No. 6,115,128 of Vann Sep. 5, 2000 shows a multi-dimensional position sensor using range detectors.

U.S. Pat. No. 5,544,254 of Hartley et al. Aug. 5, 1996 shows a system wherein the image is digitized to a computer. The system also has a template and camera.

U.S. Pat. No. 4,623,434 of Hirschmann Nov. 11, 1986 shows a multiple coordinate scanner.

U.S. Pat. No. 6,633,671 of Munich et al. Oct. 14, 2003 shows a camera based handwriting tracker wherein the most likely position of the pen is taken by detecting the position of maximum correlation obtained by correlating the pen tip template Col. 2, Line 4.

U.S. Pat. No. 5,767,842 of Korth Jun. 16, 1998 shows a system having an optical input of commands or data.

U.S. Pat. No. 5,530,207 of Dolling Jun. 25, 1996 shows an apparatus includes a template which is displaceable over the drawing surface wherein the drawing aid is connected to a data receiving machine.

None of the prior art provides applicant's unique device which provides great utility to the user to ascertain more information or feedback about indicia located at a given point on an identified surface placed in front of the scanning component that identifies the point designated by the user. Neither do these previous efforts provide the benefits attendant with the present invention. The present invention achieves its intended purposes, objects and advantages over the prior art devices through a new, useful and unobvious combination of method steps and component elements, with the use of a minimum number of functioning parts, at a reasonable cost to manufacture, and by employing readily available materials.

In this respect, before explaining at least one embodiment of the invention in detail it is to be understood that the invention is not limited in its application to the details of construction and to the arrangement, of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent construction insofar as they do not depart from the spirit and scope of the present invention.

SUMMARY OF THE INVENTION

The present invention contemplates a novel method and device that employs one or a combination of means for determining designated individual coordinates on an identified surface which can electronically communicate to a computer the exact location of the placement of an implement on the identified surface. Using a means to identify the surface being employed, once the surface is so identified, and the coordinate chosen by the user is ascertained, the disclosed device will perform an infinite variety of preprogrammed feedback responses based on the indicia located at that location identified by the user.

The recognizing process can be achieved by using an already existing devices employed as a means to identify a surface, and identify coordinates on that surface designated by a user. For ease of description this application employs the term "coordinate scanner". However, the term "scanner" should be considered broadly as any means to monitor any identifiable surface placed in its proximity and digitize coordinates on that surface identified by the user as a designated point, and then transmit the chosen coordinates to a computing means for further reaction based on the designated coordinate so chosen. Such means for scanning include but are not limited to such devices which could include light emitting diodes or lasers coupled reflecting the surface to a charge coupled device (CCD), binaural technologies which employ one or a plurality of sonic devices using sound from one or a plurality of sources to thereby determine user identified coordinates, camera-based readers to optically digitize the identified surface, digitizer pads, and a host of other devices that could be used to both scan the surface and scan the surface identifier to determine the matching memorized surface to the surface being used. Of course those skilled in the art will no doubt realize that any number of different means to scan the identified surface to ascertain user identified coordinates may be used and all such devices are considered within the scope of this application.

This device can read and transfer the coordinates of a moving object on a given surface with predefined and limited boundaries. The coordinate scanner is connected to a computing means such as a computer using a means of electronic communication such as a wire or a wireless connection.

The device is especially well adapted for use employed on a desk, or table or other locations where a student or test taker, or home user, might place the paper or other identifiable surface being used. When used on a desk, such as in a school, the device would work well to individualize the student's curriculum, to provide for testing of the individual's knowledge of a subject area such as a driver's license exam or test on math, or to provide an interface wherein the student or user can obtain more information on a subject by touching a word on the surface.

The coordinate scanner component continually monitors the surface identified and in its view or monitoring proximity and will transfer the coordinates into the computer of any point on the identified surface designated by the user. Once a point designation is determined the designated point on the identified surface is compared with memory resident copies of the identified surface to determine the exact indicia located at the designated point. When the indicia at the designated point is identified, software will then activate a pre-defined action or a function designed for the marked point in the given designated surface. This action can be an execution of any computer program so that any desired action can be triggered by touching or moving a pointer to a given point on the designated surface. Or, some form of communication or mechanical action might be initiated based on the indicia located at the designated point.

The disclosed device has the unique capabilities of turning a designated surface into a linked surface within a technical device such as a computer by the means of using one or more coordinate scanners. These devices can read and transfer the coordinates of the designated surface in conjunction with a variety of pointers, such as any form of implement including a finger as it is placed on a given point on the designated surface. The idea is to be able to point with an implement on any marked point on a designated surface and have the coordinate scanner transfer the coordinates into the computer, which will then be identified and matched to a preprogrammed similar surface and will thus activate a preprogrammed action or a function designated for the marked point on the identified surface. The coordinate scanner can be connected to the computer through a wire or a wireless connection.

To identify the surface placed in front of or being monitored by the scanning device, the device uses a means for identification of the surface in the form of a bar code, letter or number code, picture, or some other means for identifying the surface and matching it to a preprogramed identical surface which is memory resident. Also a preferred means to identify a surface bearing printed word indicia, such as a book, would be selective OCR where the device would scan a plurality of positioned words on the page such as in the four corners of the text. The four words would then be identified in their positions offering a means to identify the individual pages since it would be rare that any two pages would have the same four words in the same four positions. The coordinates on the preprogrammed surface are capable of a variety of responses such as giving the definition of a word, or the word in a different language. This action can be an execution of any computer program along with the responses being audio or displayed on a monitor. Or, the user could enter a code or number identifying the surface being employed to the computer in a lesser functioning mode of the device.

A major element of this invention is that the designated surfaces may be a very wide range of sizes and shapes, which would include books, magazines, newspapers, templates, and even contoured surfaces, as long as there is a means for surface identification which can be communicated to a computing device and matched to a virtual equivalent surface which has been placed in computer memory. The surface to be scanned for user designated points might also be virtual itself or in the form of a projection which includes the surface identifier to identify it to the scanner and the communicating computer. The coordinate scanners may be stationary but also may be portable devices that can be attached to books or magazines or templates or used in many different environments.

In use with a paper template such as that used by a child learning to read or learning to associate indicia in the form of pictures with some information about the picture, the template would be placed in a position in front of the scanner an optical or sonic type scanner or on top of a digitizer type scanner. At that point the bar code identification or some other means to identify the individual surface being employed with the scanner would read. The surface identifier information as to what designated surface is being used would be communicated to a computer which would then identify which surface stored in memory matches the identified surface and thereafter the exact coordinates of the various indicia, boxes, pictures, words, etc. that are on that identified surface.

The user would then take a means for point designation such as a pen or stylus in hand and the movement of the pen or stylus would be tracked to its exact coordinates on the clipboard and concurrently on the designated surface. In use on a book, or magazine, or tabletop, a means to trigger that a point has been identified by the user would signal the computer to read the coordinates communicated by the scanners. In most cases the trigger can be a double click or a function of time with software determining that the user has placed the point designation means on a coordinate for a period of time equal to or greater than a predetermined time period which would trigger the computer to determine the coordinates being transmitted by the scanner component for the time period and determine the exact point on the identified surface being designated by the user. These coordinates would be continually fed into the computer and when the stylus is placed on indicia at specific coordinates, the coordinate scanner would see this placement and communicate it to the computer. By comparing the coordinates detected by the scanning device on the identified surface, with the pre-stored placement of coordinates on the identified surface, actions can be initiated by simply placing the stylus on the designated surface for a sufficient period of time to trigger the next action by the computer.

The device could thus be of great utility as a teaching aid with the coordinates of every word of a paragraph or page on the surface viewed, such as a book or magazine, being stored in the computer and the words, drawings, or other indicia becoming hyper text. Such hypertext would either be hard hypertext with the actual words when designated doing a "look up" in the computer for a definition or other association, or the words or indicia could be soft hyper text where the word or indica being designated by the user for more information would be processed through a computer with a link to the Internet with the computer performing a search for the term or indica and providing the results to the user. A child learning to read and having trouble with an individual word on any page of a book would designate the word by placing a pointer on it and the word could be pronounced by audio software, defined by a computerized dictionary, or information would be displayed on a screen from web sites about the word, or definitions of the word displayed, or some other action taken when the user places a stylus on one a word or other indica that is detected by the coordinate scanners as being identified for further action.

In the case of books or magazines, the device would be especially useful since the normal books used by students would need only be scanned into the computer and the individual pages marked with a page identifier. Then the student would be able to read the book or magazine with the scanner component monitoring the surface for the student to identify any word or picture on any individual page and cause the computer to take the additional teaching or informational output action for the student. Advertisements in the magazines could also become order blanks.

Drawings and cartoons might be on the designated surface for children to look at and noises or other actions would occur when the child touches a picture with the stylus and the computer compares the coordinates of the touch with the coordinates of drawings or cartoons that are in that spot.

Employed on a desk or other surface, the device could take the form of a component with various means for stylus placement location and identification of the page included in a single component. The device would then be placed on the desk or table and using a means to align the page with the device, it would be paired up with the surface or page to be used. The means to identify the surface would use a bar code or other such means to identify it and the means to track the placement of the pointer or stylus on the page would thereafter track the placement of the pointer on the identified page and initiate the desired action on that placement. The device in such a fashion could also be used to further print advertising by providing links to products based on their positioning on the page or actually ordering products based on the user touching a drawing or picture of them. In advertising the device would work substantially in the same fashion as the device configured for a test or for information provision.

Essentially, by using a coordinate scanner to track the placement of the stylus to any point on any designated surface that has a surface identifier and has been put into computer memory, the device can function as a multitude of components depending on what is printed on the designated surface and stored in the computer for actions that occur when the coordinates of the designated surface are touched by the stylus.

As noted above, instead of using books or templates the designated surface itself might be virtual or projected on the grid being monitored by the coordinate scanner. As long as a surface identifier is projected along with the virtual surface, the scanners would identify the surface at any points designated by the user viewing it. This way a wall or blackboard could have the grid projected on it, being the designated surface, and the finger of a person touching the wall at a certain coordinate would cause the computer to perform a prerecorded action when that point is touched.

However, the actual or virtual designated surface with coordinates stored in the computer associated with actions when touched by the stylus is the current best mode. The use of the device is as broad as the number of designated surfaces with bar codes or other means for surface identification to the computer that can be pre-made and input into the computer to initiate actions when touched at certain coordinates by the stylus.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

THE OBJECTS OF THE INVENTION

It is therefore an object of the present invention to identify specific points on any surface having a surface identifier and perform preprogrammed operations associated with the identified point.

It is another object of this invention to locate specific points on a designated surface by using any designating device including your finger, and communicate that information to a computer.

It is another object of this invention to locate specific points on a designated surface by the means of using two or more coordinate scanners.

It is still another object of this invention to locate specific points on a designated contoured surface by the means of using two or more coordinate scanners.

It is a further object of this invention to identify the designated surface being viewed by means for scanable identification of the surface such as a bar code or number code or grid code placed on the surface.

An even further object of the invention is having the designated surface preprogrammed into a computer for the purpose of coordinate identification and the initiation of the effective response.

Even still another object of the invention is to simplify the reading and translation of documents.

An additional object of this invention is the provision of a device that can be used in combination with preprinted surfaces to provide ordering from advertisement.

A still further object of this invention is the provision of a device that may be employed in combination with test sheets as the scanned surfaces to allow for tests to be taken and the answers calculated at a remote location based on the placement of the stylus or marker on the page.

Lastly, it is an object of the present invention to increase the capabilities of computers through this unique combination of a coordinate scanner interface to initiate a visual or auditory response to the user based on user identified points on a surface.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The accompanying drawings, which are incorporated in and form a part of this specification, illustrate embodiments of the invention and together with the detailed description, serve to explain the principles of this invention.

For a fuller understanding of the nature and objects of the invention, reference should be had to the following detailed description taken in conjunction with the accompanying drawings which are incorporated in and from a part of this specification, illustrate embodiments of the invention and together with the description, serve to explain the principles of this invention.

DETAILED DESCRIPTION OF THE PREFERRED EMBODIMENTS

Figure 1:
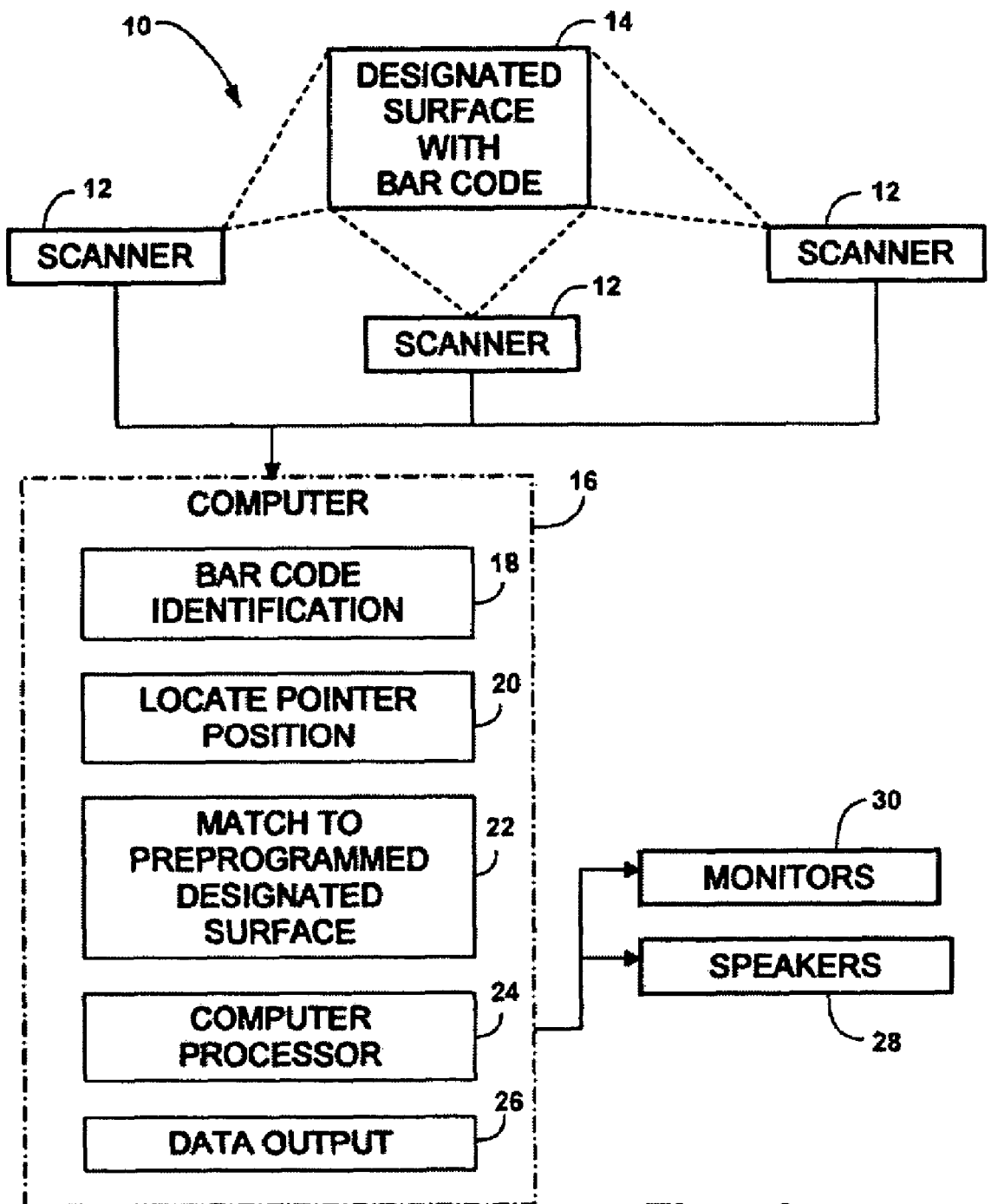
FIG. 1 depicts a block diagram illustrating the specific components of the coordinate scanner interface providing a computerized response to user identified points on a surface.

Referring now to the drawings, wherein similar parts of the invention are identified by like reference numerals, there is seen in FIG. 1 a block diagram of the coordinate scanner interface 10 that combines one of more means for scanning an identified surface noted above and herein designated as coordinate scanner 12. The coordinate scanner 12 continually scans the surface placed in a registered engagement in its viewing proximity. The surface can be any of the aforementioned surfaces bearing indicia or can be a contoured surface so long as the surface being used employs a means to identify the specific surface being used such as surface identifying indicia shown currently as bar code 14. While the bar code 14 or some other type of optically recognizable code is used in the current preferred mode of the device, those skilled in the art will no doubt realize that other means to identify the surface to a computer to allow matching to a memory resident surface can be used and such are anticipated.

The scanners or scanner 12 viewing or monitoring the surface in their field of vision or proximity of monitoring digitize and communicate to a computer 16 the exact location on a grid or by pixels or other means for determining an exact point on a surface in front of them, of the placement of the pointer on the identified surface. Once the computer 16 receives the information on the point identified by the user, using onboard software the computer 16 enables an infinite variety of preprogrammed auditory, visual, or other responses. The pointer may be as noted earlier a stylus, a finger, a pen, or any of a multitude of devices for identifying a specific point on an identifiable surface in front of the scanner 12 where indicia or another point of user interest resides.

The computer 16 using onboard software which analyses the digitized image communicated to it will first identify the exact surface placed in front of the scanner 12 using the chosen means to identify the specific surface in front of the scanner in the form of identifying indicia or other means of specifically identifying the surface including but not limited to a number code, grid code, or bar code reader or identifier, 18 as shown. As noted above, selective OCR could also be used where text indicia in a plurality of specific positions would be identified to identify the page individually. Or, the surface might be self-identified by the user entering keystrokes or placing the pointer on certain points on the surface which are designated to cause the computer to know what surface is in front of it. This manner of identification, while not as user friendly, would allow for a strictly sonic or binaural scanning of the surface for positioning of the pointer.

Once the surface is so identified, whenever the user moves to locate the pointer position 20, and the computer determines that a trigger to identify the coordinate has been initiated, a match to preprogrammed memory copy of the designated surface 22, using the computer processor 24 and software is made, to determine the exact indicia or other item located at the point identified by the user. The trigger as noted above can be simply a function of time, with the pointer placed at the designated position for a certain amount of time indicating to the computer that a point has been identified. Other means to designate and trigger an identification of a specific point on the page has been identified might be used such as magnetic templates, lights, a user activated foot or hand switch, or a microphone to pick up a tap sound. However, a time delay would currently offer the broadest use of the device since the user would only need to place a finger or pencil or the like on a word or other indicia for a determined amount of time to signal that the indicia is to be identified to the computer.

Once the point identified by the user has been determined, the computer identifies from memory the indica located at the designated point. The indicia at the designated point, as noted above can function as actual hyper text in the case of text being the identified indica triggering a look up of the definition or the actual sound of the word so identified. Or the indicia might function as soft hyper text initiating the computer to search the Internet for definitions or information related to the identified indica at the designated point. As such, from a single input designation by the user of a specific point on the identified surface in front of the scanner, any number of outputs from the computer may be initiated where the computer outputs data 26 to the speakers 28 and monitor 30 or both or takes some other action based on the point on the surface the user has identified through the scanner.

Figure 2:
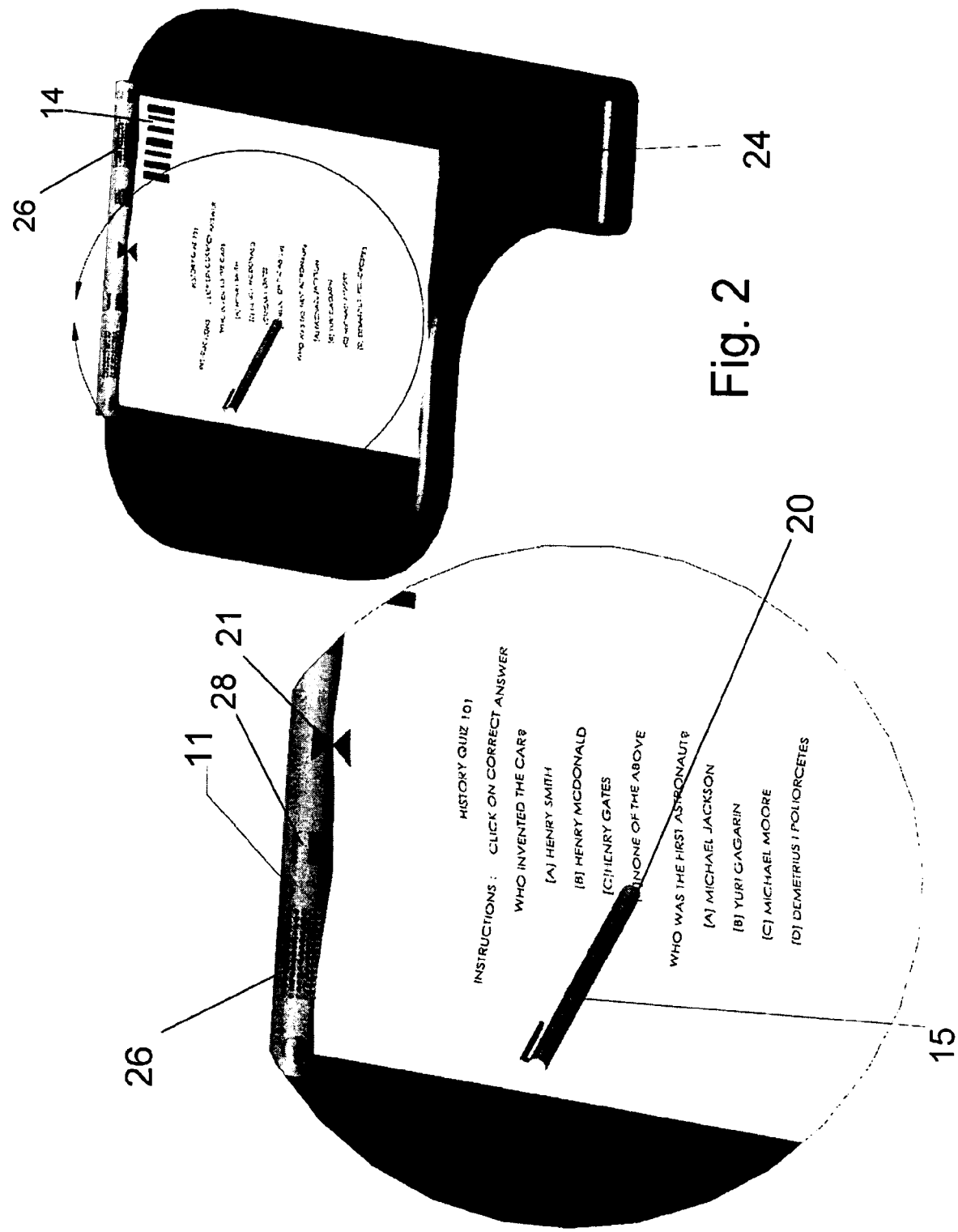
FIG. 2 depicts an embodiment of the disclosed device adapted for table or desk engagement in combination with the identified surface in registered engagement.

FIG. 2 depicts an embodiment of the disclosed coordinate scanner interface device 11 adapted for table or desk 24 engagement for use in combination with the identified surface placed in front of the device 11 in a registered engagement. A means for the user to achieve a registered engagement can be provided by a number of visual queues such as arrows 21 printed on both the device 11 or table and the surface 13 placed in front of the device 11. This embodiment of the device 11 as in all the other embodiments, would be in contact electronically with a computer 16 to relay positioning of the pointer 15 in front of it and to relay the identification of the surface 13 using means of identification such as the bar code 14 being read by a bar code reader 18.

As shown in FIG. 2 the surface 13 can have a test printed upon it with the various answers to the questions also printed upon it. In use the user would pick the correct answer with the pointer 15 such as a pencil and the device 11 would relay to the computer the various answers to the various questions chosen by the user based on the stored image in the computer and the coordinates of all of the indicia on the surface 13. This would allow tests to be taken by many individuals in a classroom or testing center and the answer sheets to be graded in real time based on the user's positioning of the pointer 15 or other means for identifying the chosen point on the surface 13.

Figure 3:
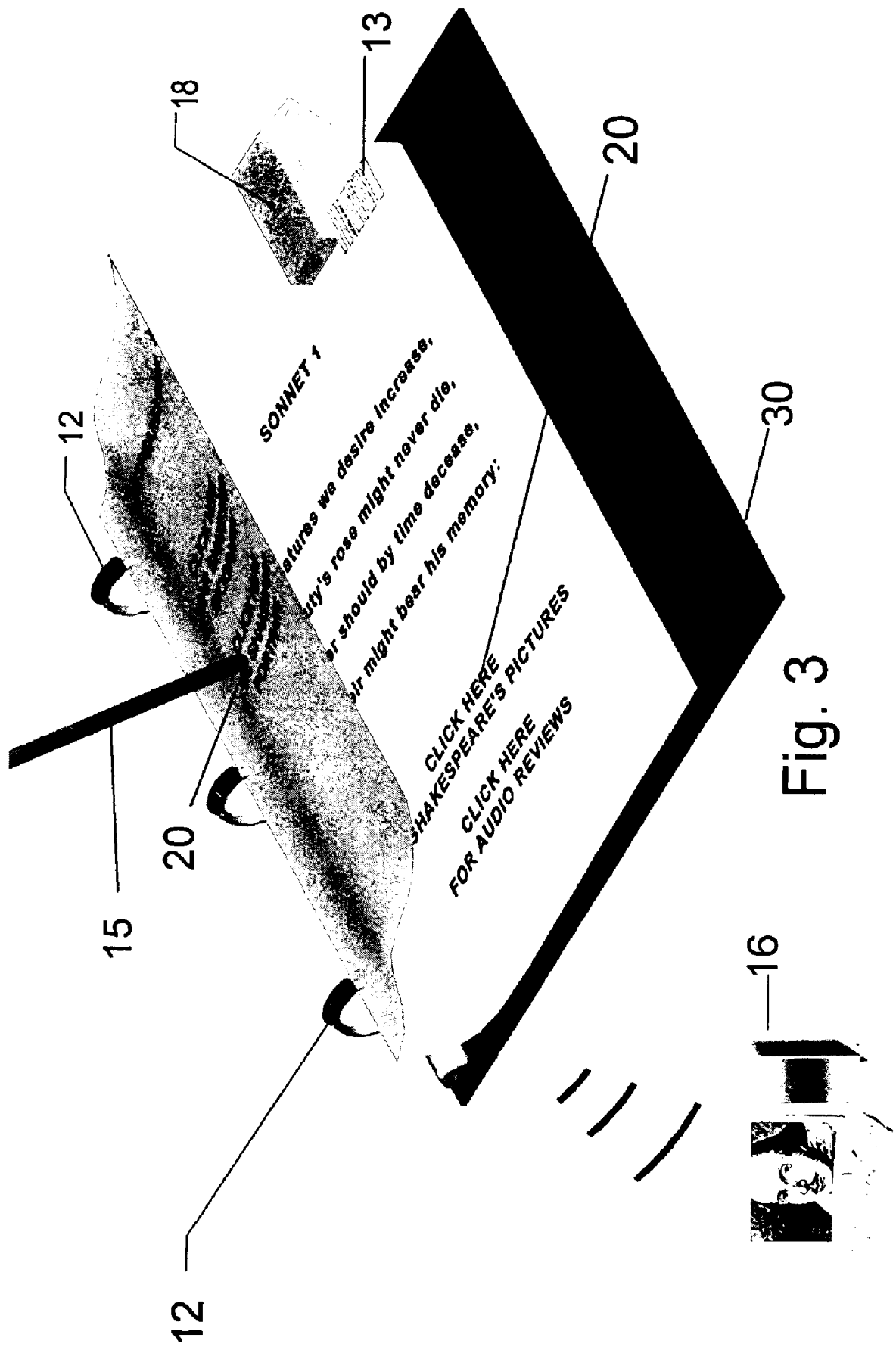
FIG. 3 is an additional embodiment of the disclosed device wherein the scanning components are mounted in a binder that has pages insertable in registered engagement and showing an electronic communicative engagement to a remote computer.

The depicted device 11 would also work well for general reading of the surface 13 placed in front of it and supplying additional information regarding the indica such as word definitions, computer links to sites about the word or picture identified, or other information relayed to the user based upon the software in the computer and the actions by the user in identifying a point on the page with indicia such as a word or drawing or photo at that point of identification. For example as shown in FIG. 3, placing the pointer 15 on the word Shakespear could cause the computer 16 to render a picture of Shakespear on the display or take the user to websites about Shakespear. This would be enabled by the stored image in the computer 16 knowing the indica located at the identified position on the page relates to Shakespear. However as already noted, the surface 13 can be a test and the identified positions of the pointer could determine answers, or the surface 13 could be an advertisement with the identified positions of the pointer being products which are ordered by pointing at them. In the case of advertisements, the ads could be printed in catalogs or in magazines with page identifiers on them to allow for the user to simply tear them out, or place them in front of the device 11 for identification and ease of ordering the products at the various identifiable points on the surface 13.

As noted above, the pointer 15 might be a pencil or stylus or even a finger. Its placement on the page, generally at its distal end, can be determined sonically by microphones 26 or other means for sonic detection, or by cameras 28 or combinations of optical and sonic scanners.

Sonic placement determination would be enhanced if the pointer had a means for sound transmission at its tip or distal end used to identify the point on the surface, however just making noise with the distal end will also identify its position on the surface 13. As a general rule two microphones 26 or other means for sonic detection work best to determine the point identified by sound on the surface 13.

As noted, the point of placement 20 on the surface 13 may be determined by cameras 28 or other means for optic determination of the point of placement on the surface which could be enhanced by the provision of a means for light transmission positioned at the distal end of the pointer. Or, in some cases, combinations of optical and sonic means for determining placement of the pointer at a designated spot on the surface could also be used.

Such means for determining the placement of the pointer at a position on the surface 13 would require generally a means for registration of the surface 13 with the device 11 such as arrows 21 printed for alignment by the user. This is especially true when the surface 13 being scanned is removable or from a kit featuring a plurality of surfaces 13 that can be placed in front of the device. Once in registered engagement with the scanning device, and identified by the means for surface identification, the rendition of the surface 13 in memory can be matched to the surface 13 in registered engagement, and the point of placement 20 identified by the visual or sonic means for identification of placement of the pointer can be determined. Subsequent action by the software would follow.

FIG. 3 is an additional embodiment of the disclosed device wherein the scanning components are mounted in a conventional binder 30 that has pages insertable in registered engagement using conventional rings which open to engage holes in the surface 13 of the paper. This ring and hole engagement would thereby easily provide a means for registration of the surface 13 with the device 11 as shown in FIG. 2, or in as shown in FIG. 3, the optical or sonic scanning components providing the means for continuously scanning the surface to identify the placement of the pointer can actually be mounted on the rings themselves. As in the aforementioned embodiments, the scanners could be one or a combination of sonic or visual scanning devices which would continuously scan the surface 13 to determine the coordinates of placement of the pointer on the surface.

Also, as shown in FIG. 3, there is a electronic engagement to a remote computer 16 using wired or the depicted wireless communication and the device would operate in a fashion similar to that described above wherein testing, or advertising and ordering, or providing adjunct information to indicia located at a point of the surface 13 would be enabled to the user by simply placing the pointing device at the desired position on the surface 13 to identify the indicia which the user wishes to identify for an intended purpose. Subsequent to identification of the position by the scanning devices, the computer would take the action appropriate to that position on the page surface which was already identified using a bar code 14 and bar code reader 18 or some other means to identify the surface 13 to the computer. While testing and advertising are specifically noted as preferred uses, those skilled in the art will no doubt realize that there are an infinite number of other uses for which the device and system herein described could be used where surfaces and user interaction are employed. All such uses are anticipated to be in the scope of this application.

Figure 4:
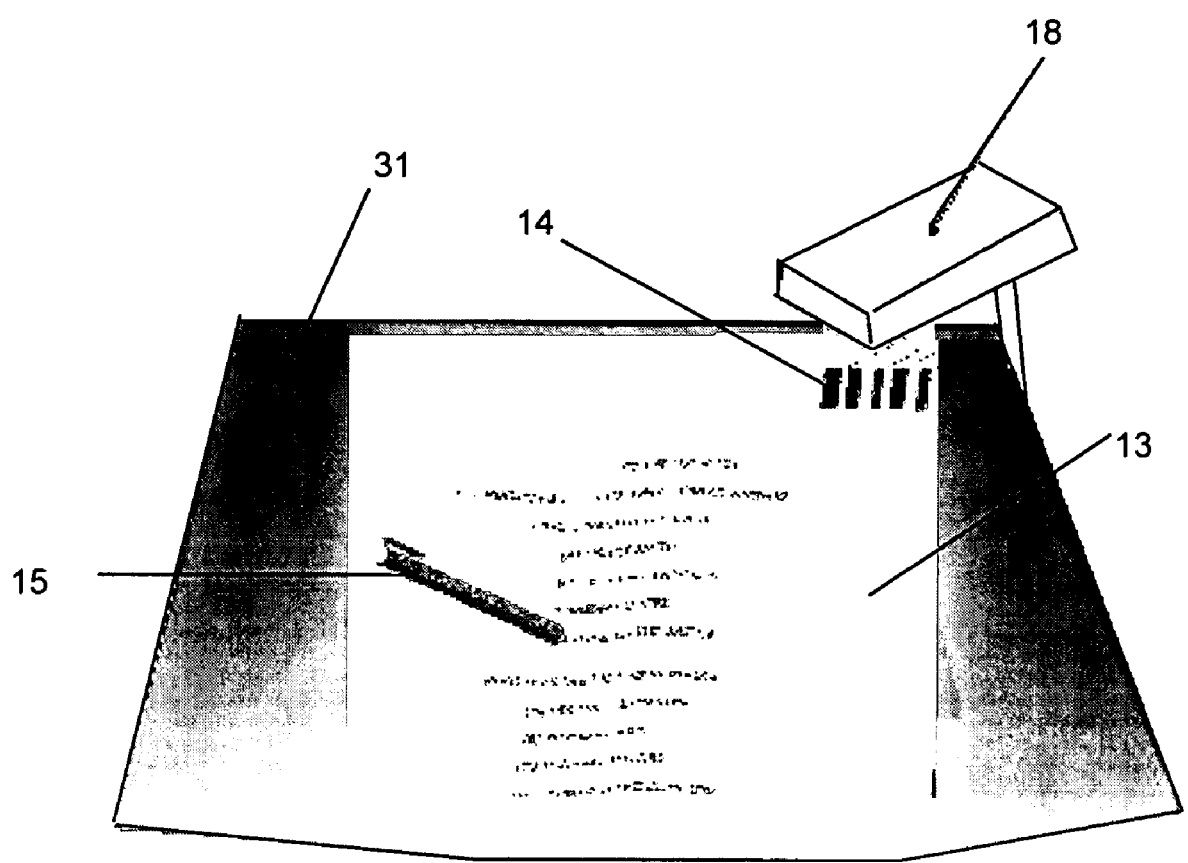
FIG. 4 depicts another embodiment of the disclosed device wherein the device for scanning the points designated on a surface is a pad type digitizer also having a means to identify the surface placed on the digitizer.

FIG. 4 depicts another embodiment of the disclosed device wherein the device employed for scanning for user designated points designated on a surface 13 is a pad type digitizer 31 which also employs a means to identify the surface placed on the digitizer 31. As depicted, a bar code reader 18 provides a means to identify the surface being placed on the digitizer 31. Then the user moves the pointer 15 to different points on the surface 13 the digitizer underneath would discern the exact point on the surface 13 that is being designated. A means for registration of the surface 13 with the digitizer 31 would be employed much like the aforementioned arrows 21 that would provide for alignment and proper registration. The points designated by the user would operate in the aforementioned fashion.

While all of the fundamental characteristics and features of the disclosed device have been described herein, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

Further, the purpose of the herein disclosed abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A surface scanning system for initiating predetermined actions based on points identified on a surface comprising:
   a surface;
   means to identify said surface to a computer having an electronic rendition of said surface stored in memory;
   means to scan said surface in electronic communication with said computer;
   means to identify a specific point on said surface to said means to scan said surface;
   user activateable means to trigger said means to scan said surface, to communicate said specific point identified by said means to identify a specific point, to said computer;
   software resident in said computer to compare said specific point identified, to specific points on said electronic rendition of said surface, and thereby identify designated indicia located at said specific point; and
   said software upon determining said designated indicia, thereafter communicating additional information relating to said designated indicia using electronic means for output of said additional information.

2. The surface scanning system of claim 1 additionally comprising:
   means to determine a registered engagement between said surface and said means to scan said surface.

3. The surface scanning system of claim 2 additionally comprising:
   said surface being a template from a kit of interchangeable surface templates; and
   said means to identify said surface to a computer comprising indicia placed on said surface which when transmitted by said scanner to said computer is matched to one of a plurality of memory resident electronic renditions of said surface templates.

4. The surface scanning system of claim 3 additionally comprising:
    said identification indicia being a bar code.
5. The surface scanning system of claim 2 additionally comprising:
    said surface being one of a group of indica bearing surfaces including a book, a newspaper, a test scoring sheet, and a magazine; and
    said means to identify said surface to a computer comprising identification indicia placed on all members of the group of indica bearing surfaces, said identification indicia which when transmitted by said scanner to said computer is matched to one of memory resident electronic renditions of said pages.
6. The surface scanning system of claim 2 additionally comprising:
    means to determine a registered engagement between said surface and said means to scan said surface comprises holes in said surface engageable with a plurality of rings through said holes.
7. The surface scanning system of claim 2 additionally comprising:
    said means to determine a registered engagement between said surface and said means to scan said surface comprises an mark on said surface alignable with a mark in a fixed position.
8. The surface scanning system of claim 2 additionally comprising:
    said means to scan said surface being a digitizer pad; and
    said means to identify a specific point on said surface being a pointer.
9. The surface scanning system of claim 8 additionally comprising:
    said means to identify said surface to a computer being a bar code on said surface readable by a bar code reader communicating with said computer.
10. The surface scanning system of claim 1 additionally comprising:
    said means to scan said surface being one or a combination of surface scanners from a group of surface scanners consisting of optical scanners and sonic scanners.
11. The surface scanning system of claim 1 additionally comprising:
    said means to scan said surface being at least one optical scanner.
12. The surface scanning system of claim 11 additionally comprising:
    said means to identify a specific point on said surface having a means to emit light at a distal end used to identify said specific point.
13. The surface scanning system of claim 1 additionally comprising:
    said means to scan said surface being at least one sonic scanner.
14. The surface scanning system of claim 13 additionally comprising:
    means to identify a specific point on said surface having a means to broadcast sound at a distal end used to identify said specific point.
15. The surface scanning system of claim 1 additionally comprising:
    said means to scan said surface adapted for engagement to a table or desk.
16. The surface scanning system of claim 1 additionally comprising:
    said surface being a template from a kit of interchangeable surface templates; and
    said means to identify said surface to a computer comprising indicia placed on said surface which when transmitted by said scanner to said computer is matched to one of a plurality of memory resident electronic renditions of said surface templates.
17. The surface scanning system of claim 1 additionally comprising:
    said surface being one of a group of indica bearing surfaces including a book, a newspaper, a test scoring sheet, and a magazine; and
    said means to identify said surface to a computer comprising identification indicia placed on all members of the group of indica bearing surfaces, said identification indicia which when transmitted by said scanner to said computer is matched to one of memory resident electronic renditions of said pages.
18. The surface scanning system of claim 17 additionally comprising:
    said identification indicia being a bar code.
19. The surface scanning system of claim 1 additionally comprising:
    said means to scan said surface being a digitizer pad; and
    said means to identify a specific point on said surface being a pointer.
20. The surface scanning system of claim 19 additionally comprising:
    said means to identify said surface to a computer being a bar code on said surface readable by a bar code reader communicating with said computer.
21. A method of surface scanning and providing electronic feedback based on specific points on a surface identified by the user through a surface scanner continuously monitoring said surface comprising:
    placing an electronic copy of said surface in computer memory;
    placing a means to identify said surface to said computer having said electronic copy of said surface stored in memory, on said surface;
    having the user employ a means to identify a specific point on said surface, to identify said specific point;
    communicating said specific point identified by said user electronically from said surface scanner to said computer;
    employing software resident in said computer to compare said specific point identified, to said electronic copy of said surface and thereby identify specific indicia located at said specific point; and
    employing said software thereafter to communicate additional information relating to said designated indica, using an electronic means for output of said additional information.
22. The method of surface scanning and providing electronic feedback based on specific points on a surface identified by the user of claim 21 additionally comprising:
    said surface being a test; and
    said additional information relating to said designated indica being said user's answers to questions on said test.
23. The method of surface scanning and providing electronic feedback based on specific points on a surface identified by the user of claim 21 additionally comprising:
    said surface being an advertisement; and
    said additional information relating to said designated indica being said user's identification of a product in said advertisement.
24. The method of surface scanning and providing electronic feedback based on specific points on a surface identified by the user of claim 23, additionally comprising:
    said computer initiating an electronic order for said product identified by said user.

* * * * *